(12) United States Patent
Ahn et al.

(10) Patent No.: US 10,990,589 B2
(45) Date of Patent: Apr. 27, 2021

(54) COMPUTING APPARATUSES AND METHODS OF PROCESSING OPERATIONS THEREOF

(71) Applicant: Samsung Electronics Co., Ltd., Suwon-si (KR)

(72) Inventors: Junwhan Ahn, Seoul (KR); Sungjoo Yoo, Seoul (KR); Kiyoung Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 720 days.

(21) Appl. No.: 15/672,800

(22) Filed: Aug. 9, 2017

(65) Prior Publication Data

US 2018/0046666 A1 Feb. 15, 2018

Related U.S. Application Data

(60) Provisional application No. 62/374,143, filed on Aug. 12, 2016.

(30) Foreign Application Priority Data

Mar. 24, 2017 (KR) ........................ 10-2017-0037674

(51) Int. Cl.
*G06F 16/242* (2019.01)
*G06F 12/0886* (2016.01)
*G06F 12/0846* (2016.01)
*G06F 16/2455* (2019.01)
*G06F 16/245* (2019.01)
*G06F 12/06* (2006.01)

(52) U.S. Cl.
CPC ........ *G06F 16/244* (2019.01); *G06F 12/0607* (2013.01); *G06F 12/0851* (2013.01); *G06F 12/0886* (2013.01); *G06F 16/24556* (2019.01); *G06F 16/24569* (2019.01); *G06F 2212/1016* (2013.01)

(58) Field of Classification Search
CPC ............ G06F 15/244; G06F 16/24569; G06F 16/24556; G06F 12/0607; G06F 12/0851; G06F 12/0886; G06F 2212/1016
See application file for complete search history.

(56) References Cited

U.S. PATENT DOCUMENTS

| 8,990,505 | B1* | 3/2015 | Jamil | .................. G06F 12/0864 711/128 |
| 10,095,543 | B1* | 10/2018 | Griffin | ................ G06F 12/0862 |
| 2016/0139920 | A1* | 5/2016 | Kravitz | ............... G06F 9/30014 712/224 |

* cited by examiner

*Primary Examiner* — Mark D Featherstone
*Assistant Examiner* — Ranjit P Doraiswamy
(74) *Attorney, Agent, or Firm* — Harness, Dickey & Pierce, P.L.C.

(57) ABSTRACT

A computing apparatus may process an operation. The computing apparatus may output information regarding an aggregation operation and an operand corresponding to a variable stored in a memory, store information regarding an operator and the aggregation operands regarding the aggregation operation, perform a first partial operation with respect to the aggregation operands and store a result value of the first partial operation, and process the aggregation operation based on storing the variable, performing a second partial operation with respect to the result value of the first partial operation stored in the cache and the operand corresponding to the variable, and storing a result value of the second partial operation.

20 Claims, 10 Drawing Sheets

```
1   for (v: graph. vertices) {
2     v.pagerank = 1 / graph.num_vertices;
3     v. next_pagerank = 0.15 / graph.num_vertices;
3   }
5   count = 0;
6   do {
7     diff = 0;
8     for (v: graph. vertices) {
9       value = 0.85 * v.pagerank / v.out_degree;
10      for (w: v.successors) {
11        w.next_pagerank += value;
12      }
13    }
14    for (v: graph. vertices) {
15      diff += abs(v.next_pagerank - v.pagerank);
16      v.pagerank = v.next_pagerank;
17      v.next_pagerank = 0.15 / graph.num_vertices;
18    }
19  } while (diff > e && ++count < max_iteration);
```

COMPUTING APPARATUSES AND METHODS OF PROCESSING OPERATIONS THEREOF

CROSS-REFERENCE TO RELATED APPLICATIONS

This application claims the benefit of U.S. Provisional Application No. 62/374,143, filed on Aug. 12, 2016, in the US Patent Office and, under 35 U.S.C. § 119, of Korean Patent Application No. 10-2017-0037674, filed on Mar. 24, 2017, in the Korean Intellectual Property Office, the disclosures of each of which are incorporated herein in their entireties by reference.

BACKGROUND

The inventive concepts relate to a computing apparatus, and more particularly, to a method by which a computing apparatus processes an aggregation operation.

The role of a processor in a computing environment is becoming increasingly important. Processors have been used to process images or moving images having gradually increasing resolution, and software algorithms used by processors have become increasingly more complicated. Processor architectures have been developed in relation to developments of various technology fields. For example, the development dual-core processor architectures, quad-core processor architectures, and multi-threading architectures, is directly related to developments associated with of image processing and software engineering.

Within a computing environment, a processor may be driven with a limited resource. For example, a communication bandwidth between a processor and a memory may be limited due to a performance bottleneck, and energy consumption of the processor may be limited to a certain level (e.g., a certain limited rate of energy consumption).

Therefore, research into increasing processing performance with a limited resource of a computing environment has been actively conducted in recent years.

SUMMARY

The inventive concepts provide a computing apparatus and a method by which the computing apparatus processes operations.

According to some example embodiments, a computing apparatus may include a core device, a cache memory, a cache controller, and an interface. The core device may be configured to output information associated with an aggregation operation using aggregation operands and an operand corresponding to a variable stored in a memory device. The cache memory may be configured to store information associated with an operator and the aggregation operands associated with the aggregation operation received from the core device. The cache controller configured to perform a first partial operation associated with the aggregation operands based on the operator and store a result value of the first partial operation in the cache memory. The memory device may be configured to process the aggregation operation based on storing the variable, performing a second partial operation associated with the result value of the first partial operation stored in the cache memory and the operand corresponding to the variable based on the operator, and storing a result value of the second partial operation. The interface may be configured to output the result value of the second partial operation to one of a display or an external remotely-located device.

According to some example embodiments, a method may include outputting information associated with an aggregation operation using aggregation operands and an operand corresponding to a variable stored in a memory, storing information associated with an operator and the aggregation operands associated with the aggregation operation, performing a first partial operation associated with the aggregation operands based on using the operator and storing a result value of the first partial operation, and performing a second partial operation associated with the result value of the first partial operation and the operand corresponding to the variable based on using the operator, storing a result value of the second partial operation in the memory, and outputting the result value of the second partial operation to one of a display or an external remotely-located device.

According to some example embodiments, a computing apparatus may include a memory storing a program of instructions and a processor. The processor may be configured to execute the program of instructions to output information associated with an aggregation operation using aggregation operands and an operand corresponding to a variable stored in the memory, store information associated with an operator and the aggregation operands associated with the aggregation operation, perform a first partial operation associated with the aggregation operands based on using the operator and storing a result value of the first partial operation, perform a second partial operation associated with the result value of the first partial operation and the operand corresponding to the variable based on using the operator, and output a result value of the second partial operation to one of a display or an external remotely-located device.

According to some example embodiments, a computing apparatus may include a memory storing a program of instructions and a processor. The processor may be configured to execute the program of instructions to output information associated with an aggregation operation using aggregation operands and an operand corresponding to a variable stored in a memory device, store information associated with an operator and the aggregation operands associated with the aggregation operation, perform a first partial operation associated with the aggregation operands based on the operator and store a result value of the first partial operation, and output the result value of the first partial operation to one of a display or an external remotely-located device.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
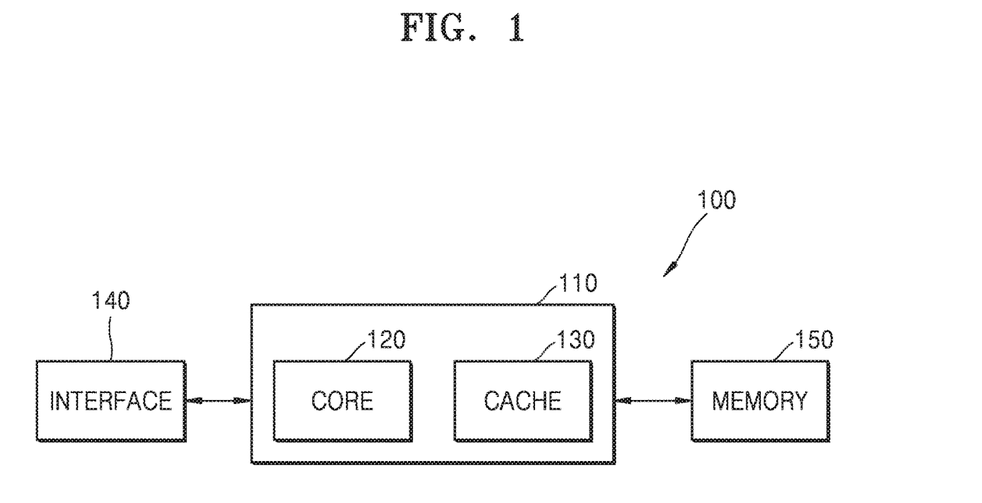
FIG. 1 is a block diagram showing a configuration of a computing apparatus according to some example embodiments.

FIG. 1 is a block diagram showing a configuration of a computing apparatus according to some example embodiments.

Referring to FIG. 1, a computing apparatus 100 may include a processor 110 and a memory 150. For example, the computing apparatus 100 may be a desktop computer, a laptop computer, a smart phone, a personal digital assistant (PDA), a portable media player, a video game console, a television set top box, a tablet device, an e-book reader, or a wearable device, but is not limited thereto. The memory 150 may be referred to herein as a "memory device." As shown in FIG. 1, the computing apparatus 100 may, in some example embodiments, include an interface 140.

The processor 110 refers to hardware that controls operations of all components included in the computing apparatus 100. The processor 110 may include a core 120 and a cache 130. For example, the processor 110 may be a central processing unit (CPU), a graphics processing unit (GPU), an application processor (AP), or a combination thereof, but is not limited thereto.

The core 120, also referred to herein as a "core device," is a hardware configuration for executing various instructions, and the processor 110 may include at least one core 120. The core 120 may include an instance of hardware that includes a portion of the hardware of the processor 110. The core 120 may process an operation requested by an instruction, read out data necessary for an operation from the cache 130 or the memory 150, or transfer data to the cache 130 or the memory 150. In some example embodiments, when the number ("quantity") of times that the core 120 accesses the memory 150 decreases, a time for the core 120 to process an instruction may be reduced, and thus the energy efficiency of the computing apparatus 100 may be improved. Restated, the core processing time associated with the core 120 processing an instruction may be directly proportional to the quantity of instances of the core 120 accessing the memory 150. Therefore, the processor 110 of the computing apparatus 100 may include the cache 130, in addition to the memory 150. The cache 130, also referred to herein as a "cache device" and/or a "cache memory," is a buffer-type high-speed storage device. The cache 130 may include an instance of hardware that includes a portion of the hardware of the processor 110. Although storage capacity of the cache 130 is less than that of the memory 150, the cache 130 may provide a wider bandwidth than the memory 150. Therefore, the processor 110 stores frequently accessed data in the cache 130 from data stored in the memory 150, and thus the processor 110 may read out the frequently accessed data immediately from the cache 130 without repeatedly searching for the frequently accessed data in the memory 150. For example, the cache 130 may include at least one type of storage medium from among a flash memory, static random access memory (SRAM), and dynamic random access memory (DRAM), but is not limited thereto.

The memory 150 may correspond to a device that stores data processed by the processor 110 (e.g., variables, source code, instructions, etc.) or provides data to be executed by the processor 110. For example, the memory 150 may include at least one type of storage medium from among DRAM, SRAM, read-only memory (ROM), and electrically erasable programmable read-only memory (EEPROM), but is not limited thereto. Furthermore, the memory 150 may include a processor in memory (PIM). A PIM is a processor implemented by hardware logic and is designed to be connected to a memory array through a dedicated pin to process data of a memory array without latency. Meanwhile, the memory 150 having an internal processor, such as a PIM, may also be referred to as intelligent RAM, computational RAM, or a smart memory.

The memory 150 may be a non-transitory computer readable storage medium. The memory 150 may store a program of instructions associated with one or more of the operations described herein. The processor 110 may execute the program of instructions to cause the one or more operations to be performed (e.g., to cause one or more elements of the computing apparatus 100 to perform the one or more operations).

Interface 140 may correspond to a device that is configured to output information (e.g., values) stored in one or more elements of the computing apparatus, including information stored in the memory 150. In some example embodiments, interface 140 includes a display interface that is configured to present the information as part of a display. In some example embodiments, interface 140 includes a communication interface (e.g., a wired network communication interface, a wireless network communication interface, some combination thereof, or the like) that is configured to implement communication of information between the computing apparatus 100 and an external device that is separate and remotely-located from the computing apparatus 100.

Figure 2:
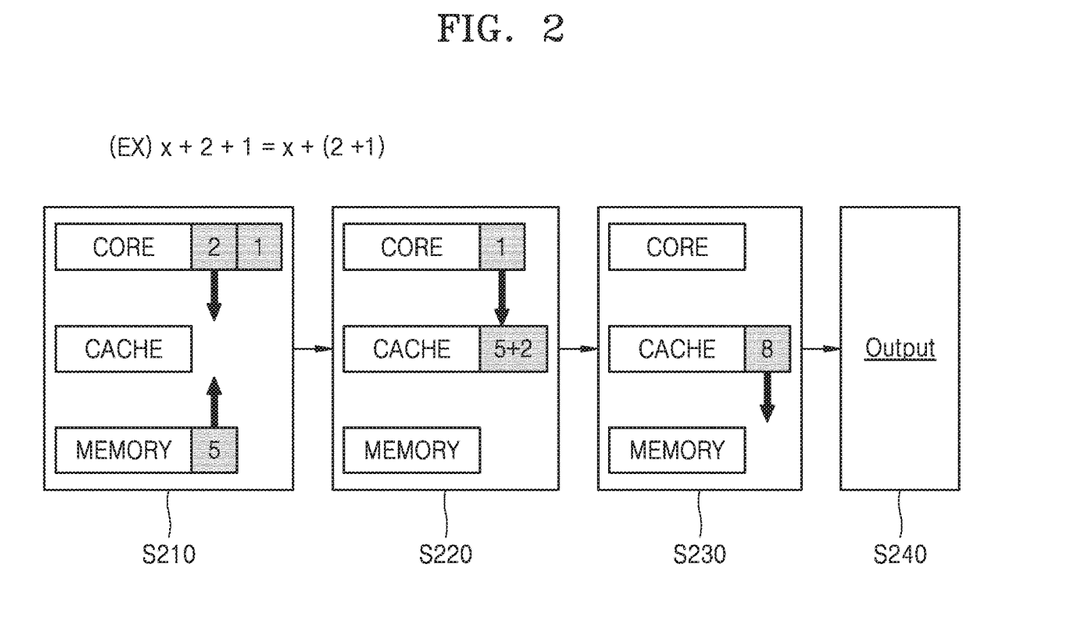
FIG. 2 is a diagram for describing a method by which a computing apparatus processes an operation according to some example embodiments.

FIG. 2 is a diagram for describing a method by which a computing apparatus processes an operation according to some example embodiments.

The computing apparatus 100 may process an operation using an operand corresponding to a variable stored in the memory 150 by repeatedly accessing the memory 150. Specifically, FIG. 2 is a diagram for describing a method by which the core 120 processes an operation requested by an instruction when the operation is an operation for sequentially adding 2 and 1 to a variable x stored in the memory 150. As shown in FIG. 2, the method may include a sequence of operations S210-S240 that include the core, cache, and memory.

In operation S210, the core 120 may load the initial value 5 of the variable x from the memory 150, add 5 and 2 first, and store a result value of 7 in the cache 130.

In operation S220, in order to perform a second addition operation, the core 120 may add 7 and 1 stored in the cache 130 and store a result value of 8 in the cache 130.

In operation S230, the result value 8 stored in the cache 130 may be transferred to the memory 150 when a cache block stored in the cache 130 is released. Here, the cache block may be defined as a unit of data transferred from the cache 130 to the memory 150. Furthermore, a cache block may include a plurality of words.

Therefore, when the computing apparatus 100 uses the memory 150 and the cache 130, every time an operation using an operand corresponding to the variable x stored in the memory 150 is performed, it is necessary to access the memory 150 twice, and thus energy efficiency of the computing apparatus 100 may be reduced.

In operation S240, one or more values stored in the memory 150 may be "output" via interface 140. As noted above, interface 140 may include a display interface, such that operation S240 includes displaying the one or more stored values as part of a display via interface 140. As further noted above, interface 140 may include a communication interface, such that operation S240 includes transmitting ("communicating") the one or more stored values to an external device that is separate and remotely-located from the computing apparatus 100 (e.g., an "external remotely-located device") via interface 140.

Figure 3:
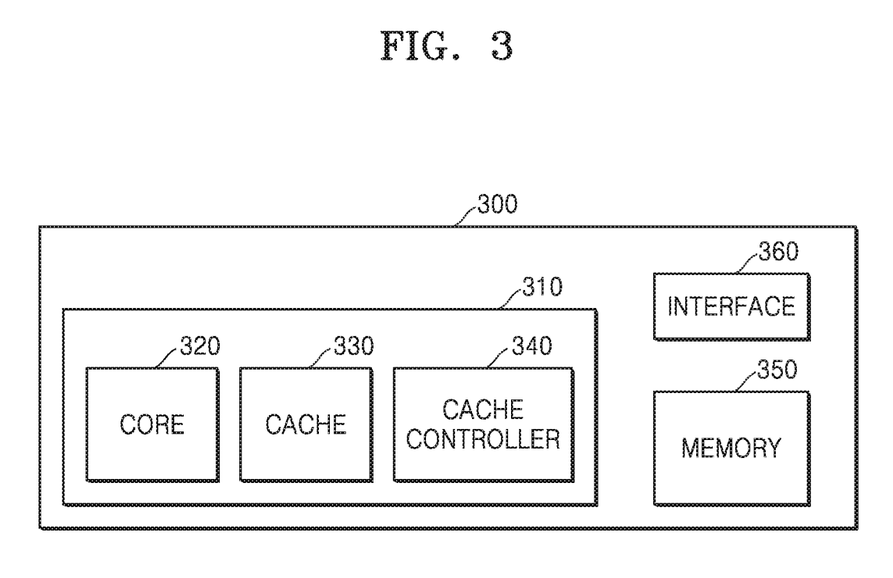
FIG. 3 is a block diagram showing a configuration of a computing apparatus, according to some example embodiments.

FIG. 3 is a block diagram showing a configuration of a computing apparatus, according to some example embodiments.

A computing apparatus 300 according to some example embodiments may include a processor 310 and a memory 350, and the processor 310 may include a core 320, a cache 330, and a cache controller 340. In some example embodiments, only components of the computing apparatus 300 related to embodiments are shown in FIG. 3. Therefore, it will be understood by one of ordinary skill in the art that general-purpose components other than the components shown in FIG. 3 may be further included. As shown in FIG. 3, the computing apparatus 300 may include an interface 360. The interface 360 may be similar to the interface 140 described above and may be configured to operate similarly to the configurations described above with reference to interface 140.

The core 320 may output information regarding ("associated with") an aggregation operation that uses aggregation operands and operands corresponding to variables stored in the memory 350.

Here, when an operation requested by an instruction is a set of a first partial operation and a second partial operation satisfying an exchange rule and a combining rule, the core 320 may determine the operation to be an aggregation operation. For example, when an operation requested by an instruction is a set of a first partial operation for adding 2 to the variable x and a second partial operation for adding 1 to the result value of the first partial operation, since an exchange rule and a combining rule are satisfied, the operation may be determined to be an aggregation operation.

Furthermore, aggregation operands may be defined as remaining operands of operands used by an aggregation operation other than variables. For example, in the case of an aggregation operation that is a set of a first partial operation for adding 2 to the variable x and a second partial operation for adding 1 to the result value of the first partial operation, aggregation operands may be 2 and 1 and an operator may be addition.

The cache 330 may store information regarding an operator and aggregation operands of an aggregation operation received from the core 320. Specifically, the cache 330 may store information regarding an operator in a tag area of the cache 330 and store at least one of the aggregation operands or a result value of the first partial operation in a cache block. Furthermore, when a cache miss occurs, the cache 330 may store the identity of the first partial operation.

The cache controller 340 may perform a first partial operation with respect to aggregation operands stored in the cache 330 by using an operator and store a result value of the first partial operation in the cache 330.

Furthermore, as the cache controller 340 also receives an instruction for loading a variable stored in the memory 350, the cache controller 340 may perform a second partial operation with respect to operands corresponding to the variable loaded from the memory 350 by using an operator and store a result value of the second partial operation in the cache 330.

The memory 350 may store a variable, perform the second partial operation with respect to operands corresponding to a result value of the first partial operation stored in the cache 330 and operands corresponding to the variable by using an operator, and store a result value of the second partial operation, thereby processing an aggregation operation.

Figure 4:
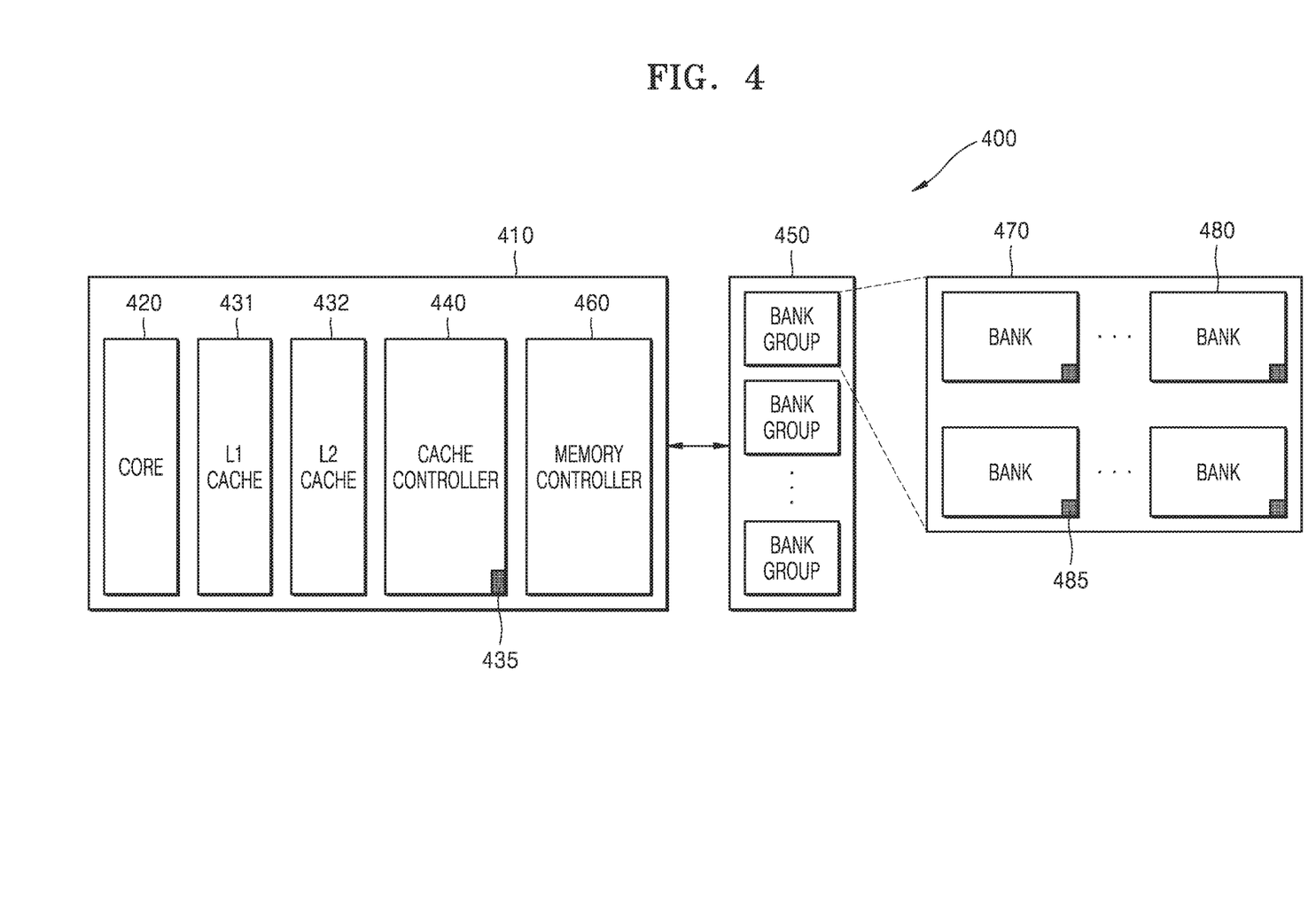
FIG. 4 is a block diagram showing a configuration of a computing apparatus in detail, according to some example embodiments.

FIG. 4 is a block diagram showing a configuration of a computing apparatus in detail, according to some example embodiments.

A processor 410 of a computing apparatus 400 according to some example embodiments may include a core 420, an L1 cache 431, an L2 cache 432, a cache controller 440, and a memory controller 460. Furthermore, the computing apparatus 400 may further include a memory 450. Furthermore, the computing apparatus 400 may include an interface (not shown in FIG. 4) that is similar to interface 140 and/or interface 360 as described above with reference to FIG. 1 and FIG. 3. Meanwhile, since the core 420 of FIG. 4 corresponds to the core 320 of FIG. 3, detailed description thereof will be omitted.

The cache 330 of FIG. 3 may include an L1 cache 431 and an L2 cache 432 that are classified according to levels. Referring to FIG. 4, a cache for receiving information output from the core 420 is indicated as the L1 cache 431, and a cache for releasing a cache block to the memory 450 is indicated as the L2 cache 432 However, the rule for determining levels is not limited thereto.

The cache controller 440 may include a calculator 435 for performing a first partial operation with respect to aggregation operands.

The memory controller 460 may map a word to a bank as a cache block is released from the cache 330. Here, the bank may be defined as a unit of data that is processed in parallel by the memory 450. Furthermore, the length of a bank 480 may be equal to the length of a word.

The memory 450 may include one or more bank groups 470, and the bank group 470 may include one or more banks 480. The bank may also include a calculator 485 for performing a second partial operation by using an operator of a cache block. However, although the calculator 485 is included in the memory 450, the position of the calculator 485 is not limited thereto. Furthermore, the memory 450 may independently perform an operation using by using the plurality of banks 480 included in the bank group 470 and the calculator 485. Each bank 480 and bank group 470 may include an instance of hardware included in the hardware of the memory 450.

Figure 5:
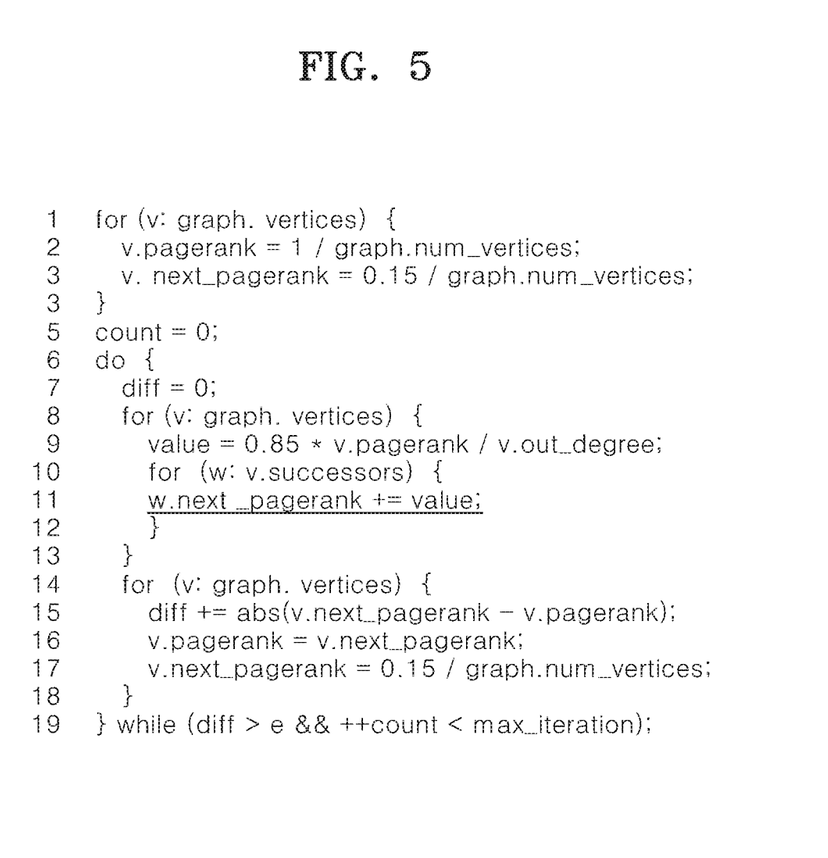
FIG. 5 is a diagram showing an aggregation operation according to some example embodiments.

FIG. 5 is a diagram showing an aggregation operation according to some example embodiments. The aggregation operation shown in FIG. 5 may be implemented by one or more elements (e.g., a processor and a memory device) of a computing apparatus as shown in any of the example embodiments included herein.

In order to reduce the number of times the memory 450 is accessed, the core 420 determines whether an operation requested by an instruction is an aggregation operation and, based on a result of the determination, may transmit information regarding an operator and aggregation operands of the aggregation operation to the cache 330. Here, an aggregation operation may be defined as a set of a first partial operation and a second partial operation that satisfy an exchange rule and a combining rule. For example, an aggregation operation may be a set of a plurality of operations including an addition operation, a multiplication operation, and an operation for obtaining a smallest value from among operands, but is not limited thereto.

FIG. 5 illustrates code indicating a page rank algorithm applied to a search engine. When a user inputs a keyword, a search engine may determine an order for displaying search results by using the page rank algorithm. Using a search engine to which the code of FIG. 5 is applied, web pages having higher page rank indexes v pagerank may be displayed primarily in a search result. Here, referring to line 11 of FIG. 5, a variable w.next_pagerank for determining the page rank index v.pagerank is a variable for storing a result of adding a value stored in the variable w.next_pagerank to another variable value. In other words, the operation stated in line 11 may be expressed by Equation 1.

$$w.next\_pagerank = w.next\_pagerank + value \quad \text{[Equation 1]}$$

The addition operation of Equation 1 is an operation satisfying the exchange rule (a+b=b+a) and the combining rule (a+b+c=(a+b)–c) and the variable w.next_pagerank is calculated repeatedly within for a statement, and thus the addition operation of Equation 1 may be determined to be an aggregation operation. Therefore, when executing the code shown in FIG. 5, the computing apparatus 400 determines that an aggregation operation is included and transmits information regarding an addition operator and a variable value, which is an aggregation operand.

Although it is assumed in the drawings below that the aggregation operation processed by the core 420 is a set of a first partial operation, which is an addition operation, and a second partial operation, which is another addition operation, it will be understood by one of ordinary skill in the art that the inventive concepts may be applied to an aggregation operation.

Figure 6:
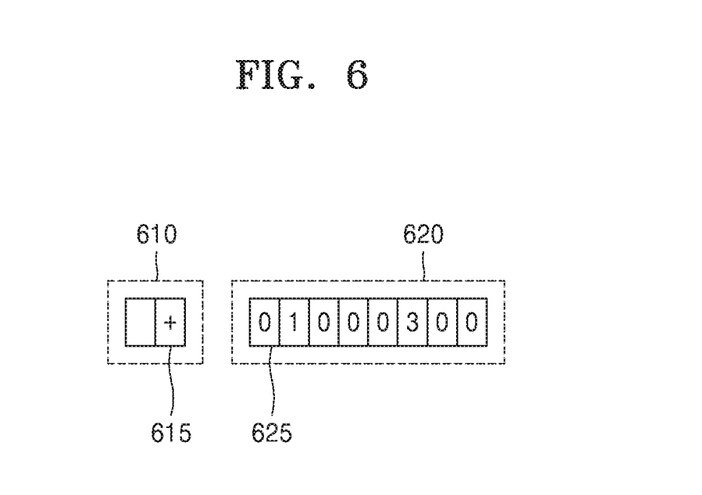
FIG. 6 is a diagram for describing a cache block according to some example embodiments.

FIG. 6 is a diagram for describing a cache block according to some example embodiments.

When data stored in the cache 330 is released to the memory 350, the computing apparatus 300 according to some example embodiments transmits information regarding an operator and aggregation operands to the memory 350 by using a cache block 620. Referring to FIG. 6, information 615 regarding an operator of an aggregation operation may be located in a cache tag area 610. However, the location at which the information 615 regarding an operator is stored is not limited thereto. Furthermore, the cache block 620 may store at least one result of a first partial operation. Furthermore, the cache block 620 may include a plurality of words 625.

Therefore, when a variable is stored in the cache 330 and/or information regarding an operator and aggregation operands is received from the core 320 and the cache tag area 610 includes the information 615 regarding an operator of an aggregation operation, the cache controller 340 may determine that a cache hit occurred. Meanwhile, the cache block 620 may include the total eight 8-byte words 625, but the length of the cache block 620 is not limited thereto.

In some example embodiments, a cache block and a cache tag area may each comprise one or more separate instances of hardware. In some example embodiments, the cache block and the cache tag area are one or more instances of hardware included in a cache of a processor. For example, the cache block 620 and the cache tag area 610 may be included in cache 330.

Figure 7:
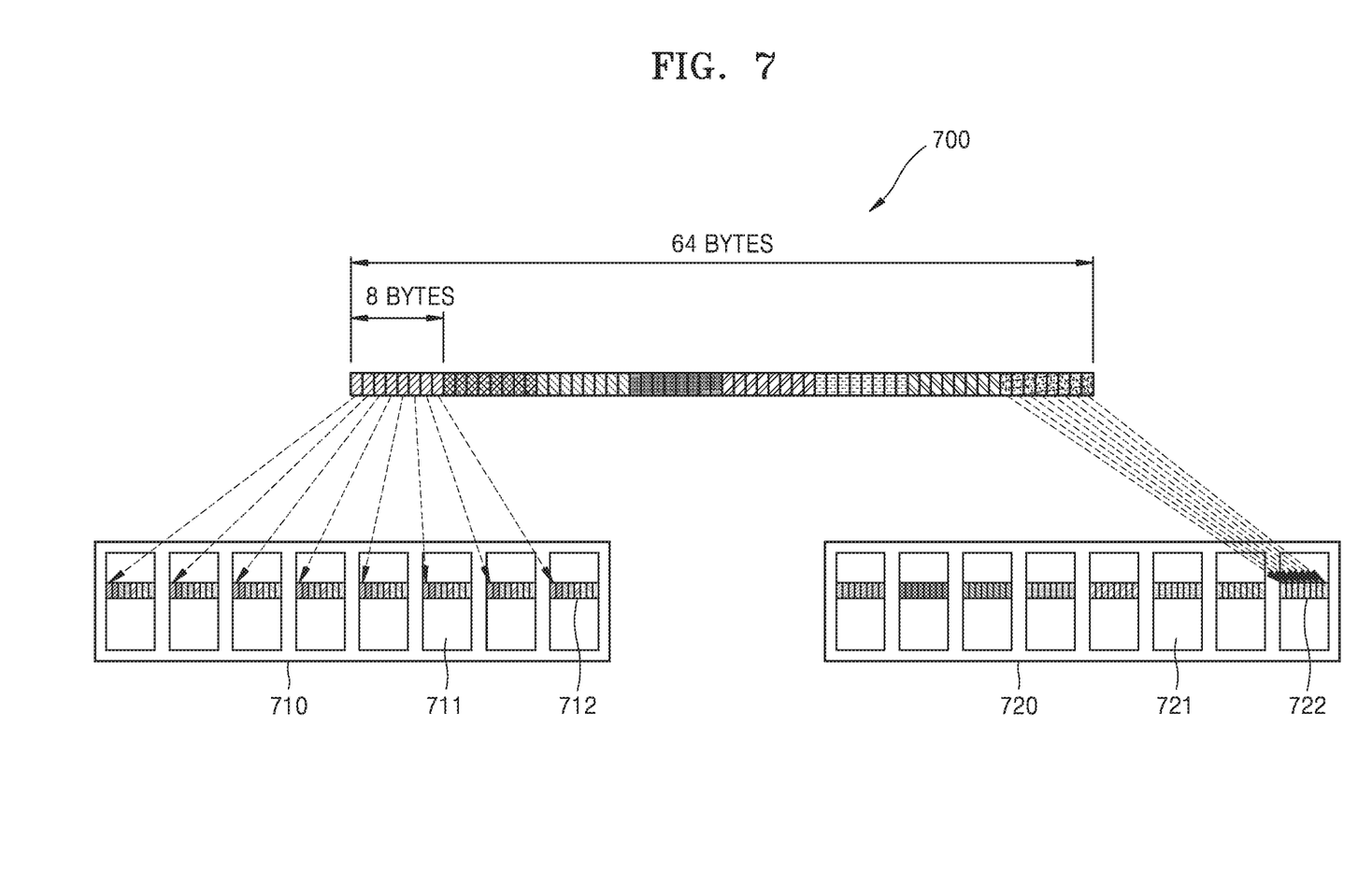
FIG. 7 is a diagram showing a method of mapping a cache block to a memory, according to some example embodiments.

FIG. 7 is a diagram showing a method of mapping a cache block to a memory, according to some example embodiments. The method may be implemented by one or more elements of a computing apparatus in any of the example embodiments included herein.

When a cache block 700 is released from the cache 330, the memory controller 460 may map words of the cache block 700 to the bank 480 of the memory 450. FIG. 7 is a diagram for describing a first memory 710 and a second memory 720 to which other mapping methods are applied.

First, in the first memory 710, bytes included in one word of the cache block 700 may be mapped to different banks 712, respectively. Referring to FIG. 7, a word may be defined as a group of 8 bytes that are included in the cache block 700 and adjacent to one another. In this case, since one word of the cache block 700 is interleaved in the plurality of banks 712 of the first memory 710, a single bank group 711 is unable to perform an operation.

In some example embodiments, referring to the second memory 720 according to some example embodiments, bytes included in one word of the cache block 700 may be mapped to one bank 722. In other words, a single bank group 721 may independently perform an operation by using the plurality of banks 722 included in the bank group 721.

Figure 8:
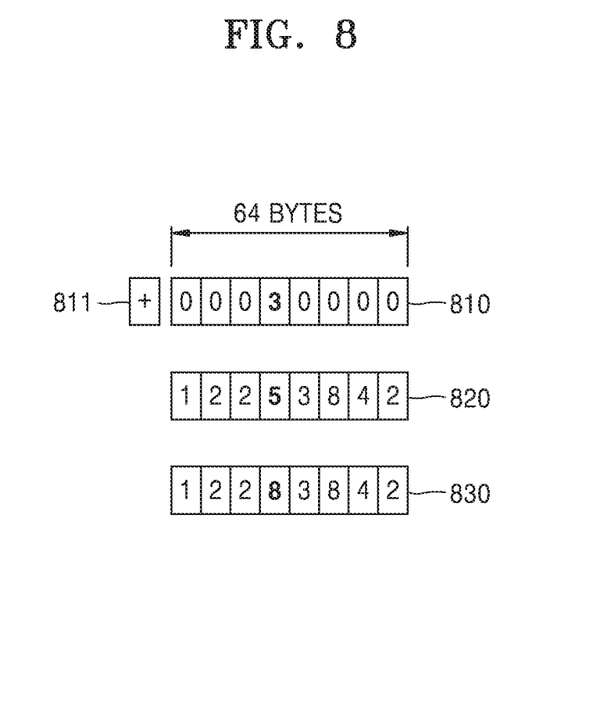
FIG. 8 is a diagram for describing a method by which a memory performs an operation independently from a single bank group, according to some example embodiments.

FIG. 8 is a diagram for describing a method by which a memory performs an operation independently from a single bank group, according to some example embodiments. The method may be performed by one or more elements of a computing apparatus in any of the example embodiments included herein.

In detail, FIG. 8 is a diagram for describing a method by which the memory 450 to which the method of mapping the second memory 720 of FIG. 7 is applied processes an operation by using the single bank group 721. Refuting to FIG. 8, a fourth word storing 5 from among eight words 12253842 (hexadecimal) in a first cache block 820 indicates a variable x and, when a second cache block 810 includes information 811 regarding an aggregation operand 3 and an addition operator, the memory 450 to which the method of mapping the second memory 720 of FIG. 7 is applied may independently process an addition operation regarding the variable x and store an operation result 830. In other words, independently from other variables included in the first cache block 820, the second memory 720 may perform an aggregation operation regarding the variable x.

Figure 9:
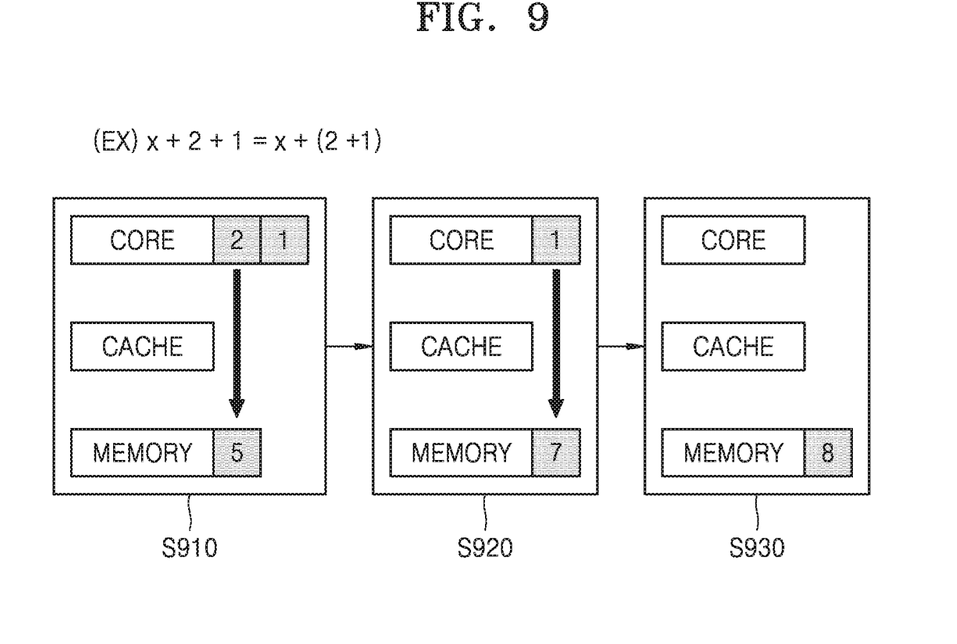
FIG. 9 is a diagram for describing a method by which a computing apparatus processes an operation, according to some example embodiments.

FIG. 9 is a diagram for describing a method by which a computing apparatus processes an operation, according to some example embodiments. As shown in FIG. 9, the method may include a sequence of operations S910-S930 that include the core, cache, and memory.

In detail, FIG. 9 is a diagram for describing a method by which the computing apparatus 400 to which the method of mapping the second memory 720 of FIG. 7 is applied processes an operation without using the cache 330. For example, when a set of operations requested by an instruction is a set of a first partial operation for adding 2 to a variable x and a second partial operation for adding 1 to a result value of the first partial operation, the core 420 transmits 2, which is an aggregation operand, to the memory 450 storing the variable x, such that the memory 450 may perform the first partial operation and store a result value of the first partial operation (S910). Therefore, the memory 450 may add 2 to 5 stored in the variable x and store a result value 7 of the first partial operation in the variable x. Here, when the cache 330 is used, cache consciousness indicating that the cache 330 always stores the latest value of the variable x may not be guaranteed. Therefore, the core 420 transmits the aggregation operand 2 to the memory 450 instead of the cache 330, and thus an operation may be performed at the memory 450.

In order to perform the second partial operation, the core 420 may transmit an aggregation operand 1 to the memory 450, and the memory may add 1 to 7 stored in the memory 450 and store a result value 8 of the second partial operation in the memory 450 (S920 and S930).

In other words, when the computing apparatus 400 uses the memory 450 (e.g., second memory 720 of FIG. 7), cache consciousness may not be guaranteed in a case of using the cache 330. Therefore, since the core 420 accesses the memory 450 instead of the cache 330 every time to perform an operation, the number of times the memory 450 is accessed may be increased as compared to a case of using the cache 330.

Figure 10:
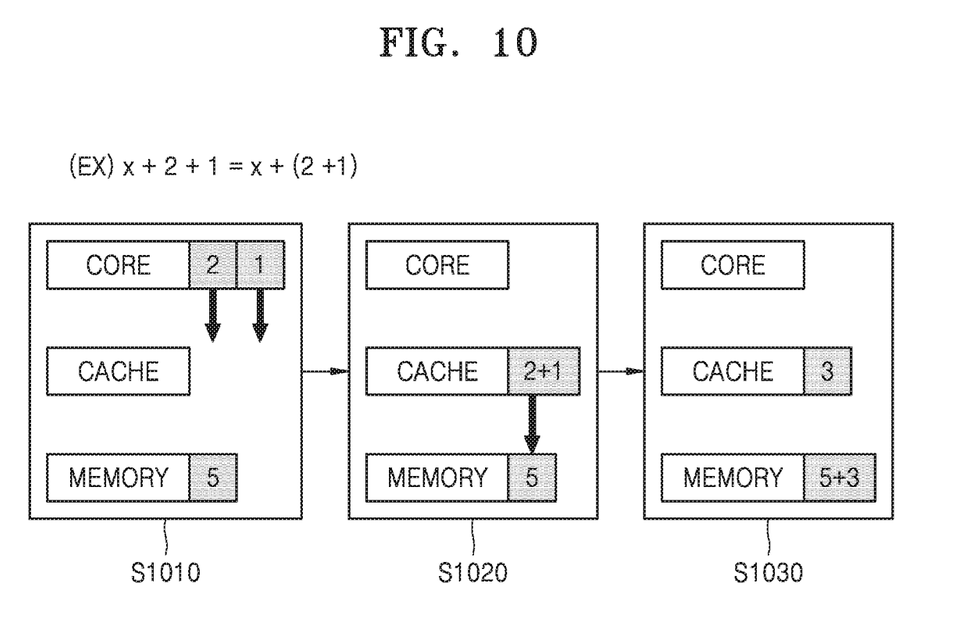
FIG. 10 is a diagram for describing a method by which a computing apparatus processes an operation, according to some example embodiments.

FIG. 10 is a diagram for describing a method by which a computing apparatus processes an operation, according to some example embodiments. As shown in FIG. 10, the method may include a sequence of operations S1010-S1030 that include the core, cache, and memory.

When a set of operations requested by an instruction is a set of a first partial operation for adding 2 to a variable x and a second partial operation for adding 1 to a result value of the first partial operation, the computing apparatus 400 according to some example embodiments may process an aggregation operation by using the cache block 620 of FIG. 6 and the method of mapping the second memory 720 of FIG. 7.

In operation S1010, the core 420 may determine whether an operation included in an instruction is an aggregation operation. Referring to FIG. 10, since the first partial operation and the second partial operation are a set of operations satisfying an exchange rule and a combining rule, the core 420 may determine that the operation requested by the instruction is an aggregation operation. Therefore, the core 420 may output information regarding a plurality of operations to the cache 330. For example, the core 420 may output information regarding the aggregation operation to the cache 330. Here, the information regarding the aggregation operation may include information regarding an operator and aggregation operands of the aggregation operation. Referring to FIG. 10, the operator of the aggregation operation may be addition, and the aggregation operands may be 2 and 1.

In operation S1020, the cache controller 440 may perform the first partial operation with respect to the aggregation operands stored in the cache 330 and store a result value of the first partial operation in the cache 330. Referring to FIG. 10, the cache controller 440 may perform the first partial operation for adding the aggregation operands 2 and 1 to each other and store a result value of the first partial operation result, which is 3, in the cache 330.

In operation S1030, when a cache block stored in the cache 330 is released, the result 3 of the first partial operation, stored in the cache 330 may be transferred to the memory 450. After performing a second partial operation for adding an operand 5 corresponding to the variable x to the result 3 of the first partial operation result, a result value S of the second partial operation may be stored in the memory 450.

Therefore, the computing apparatus 400 stores results of the first partial operations regarding aggregation operands except an operand corresponding to a variable stored in the memory 450 in the cache 330 and transmits the results of the first partial operation to the memory 450, and thus the number of times the processor 410 accesses the memory 450 for processing the aggregation operation may be reduced.

Figure 11:
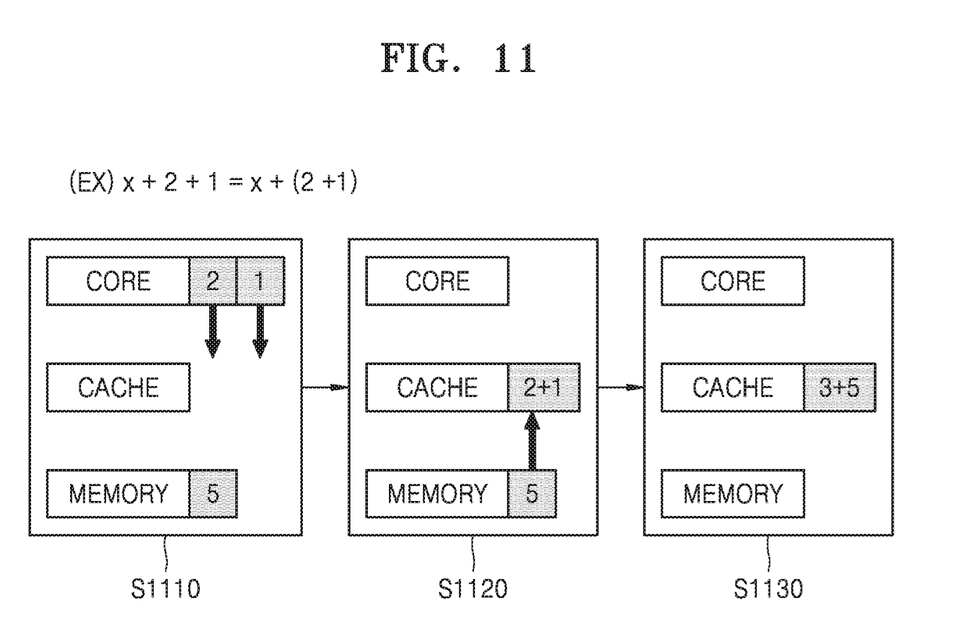
FIG. 11 is a diagram showing a method by which a computing apparatus processes an operation, according to some example embodiments.

FIG. 11 is a diagram showing a method by which a computing apparatus processes an operation, according to some example embodiments. As shown in FIG. 11, the method may include a sequence of operations S1110-S1130 that include the core, cache, and memory.

As the cache controller 440 receives an instruction for loading a variable stored in the memory 450, the cache controller 440 may perform a second partial operation with respect to a result value of the first partial operation stored in the cache 330 and an operand corresponding to the variable loaded from the memory 450 and store a result value of the second partial operation in the cache 330. Meanwhile, since operation S1110 of FIG. 11 corresponds to operation S1010 of FIG. 10, detailed description thereof will be omitted.

In operation S1120, when the core 420 receives an instruction for loading a variable x, the core 420 may transfer the variable x stored in the memory 450 to the cache 330.

In operation S1130, the cache controller 440 may perform a second partial operation for adding an operand 5 corresponding to the variable x received from the memory 450 to a result value 3 of the partial operation stored in the cache 330 and store a result value 8 of the second partial operation in the cache 330.

Figure 12:
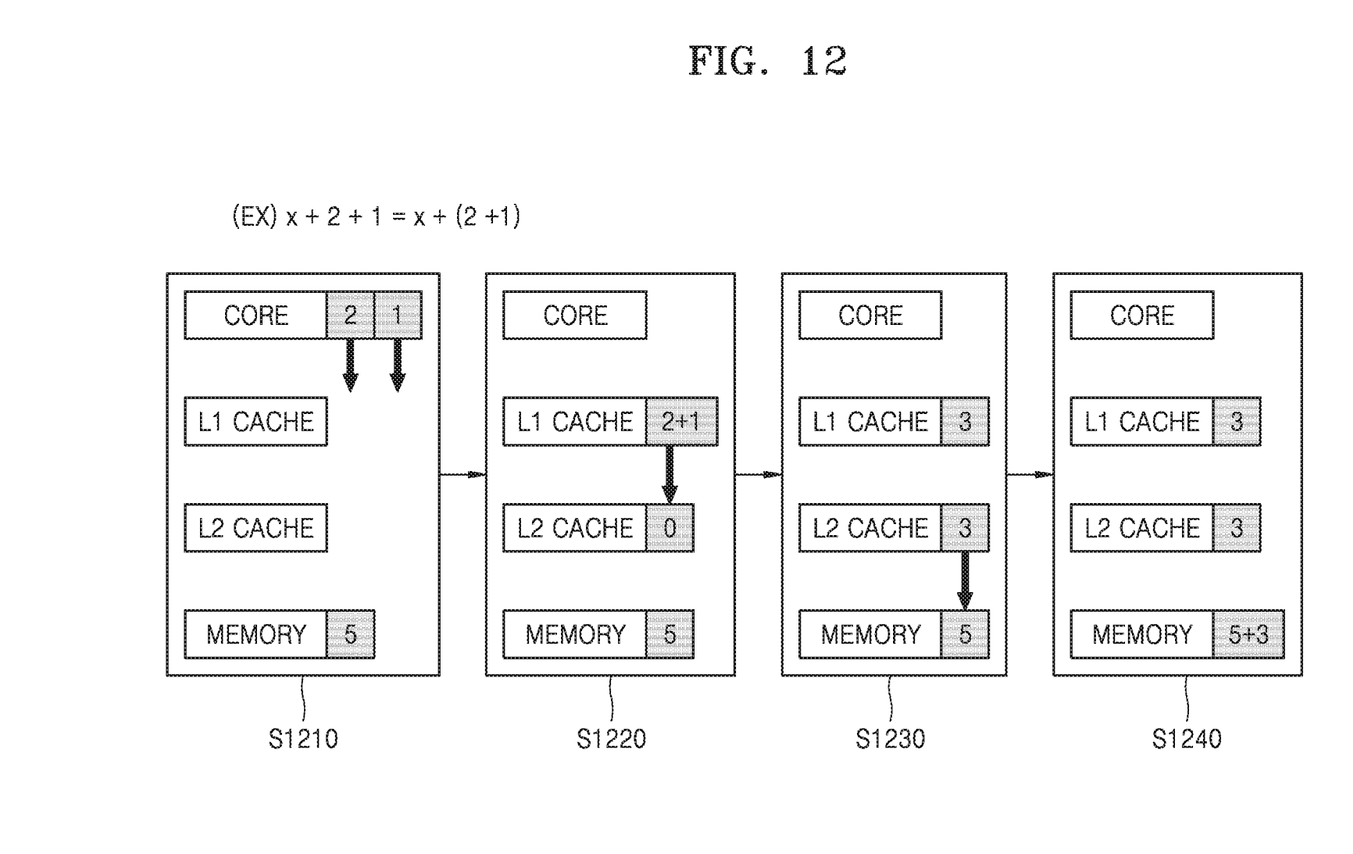
FIG. 12 is a diagram for describing a method by which a computing apparatus including a plurality of levels of caches processes an operation, according to some example embodiments.

FIG. 12 is a diagram for describing a method by which a computing apparatus including a plurality of levels of caches processes an operation according to some example embodiments. As shown in FIG. 12, the method may include a sequence of operations S1210-S1240 that include a core, an L1 cache, an L2 cache, and a memory.

The cache 330 according to some example embodiments may store the identity of a first partial operation when a cache miss occurs. Meanwhile, the computing apparatus 400 may include a plurality of levels of caches.

In operation S1210, the core 420 determines whether an operation requested by an instruction is an aggregation operation and outputs information regarding an operator and aggregation operands of the aggregation operation to the cache 330 based on a result of the determination. Referring to FIG. 10, the core 420 may sequentially output information regarding aggregation operands, which are 2 and 1 and an operator to the L1 cache 431, for example.

In operation S1220, when the cache controller 440 receives information regarding an operator and aggregation operands of the aggregation operation from the core 420, the cache controller 440 may perform a first partial operation with respect to the aggregation operands by using the operator. Referring to FIG. 12, the cache controller 440 may perform a first partial operation for add the aggregation operands 2 and 1 to each other and store a result value 3 of the first partial operation in the L1 cache 431. At this time, since a cache miss occurs at the L2 cache 432, the L2 cache 432 may store 0, which is the identity of the first partial operation. Furthermore, a cache block of the L1 cache 431 may be released to the L2 cache 432. Therefore, the result value of the first partial operation 3 stored in the L1 cache 431 may be transferred to the L2 cache 432.

In operation S1230, when a cache block stored in the L2 cache 432 is released, the result value of the first partial operation 3 stored in the L2 cache 432 may be transferred to the memory 450.

In operation S1240, the memory 450 may perform a second partial operation for adding an operand 5 corresponding to the variable x to the result value 3 of the first partial operation received from the L2 cache 432 and store a result value 8 of the second partial operation.

Figure 13:
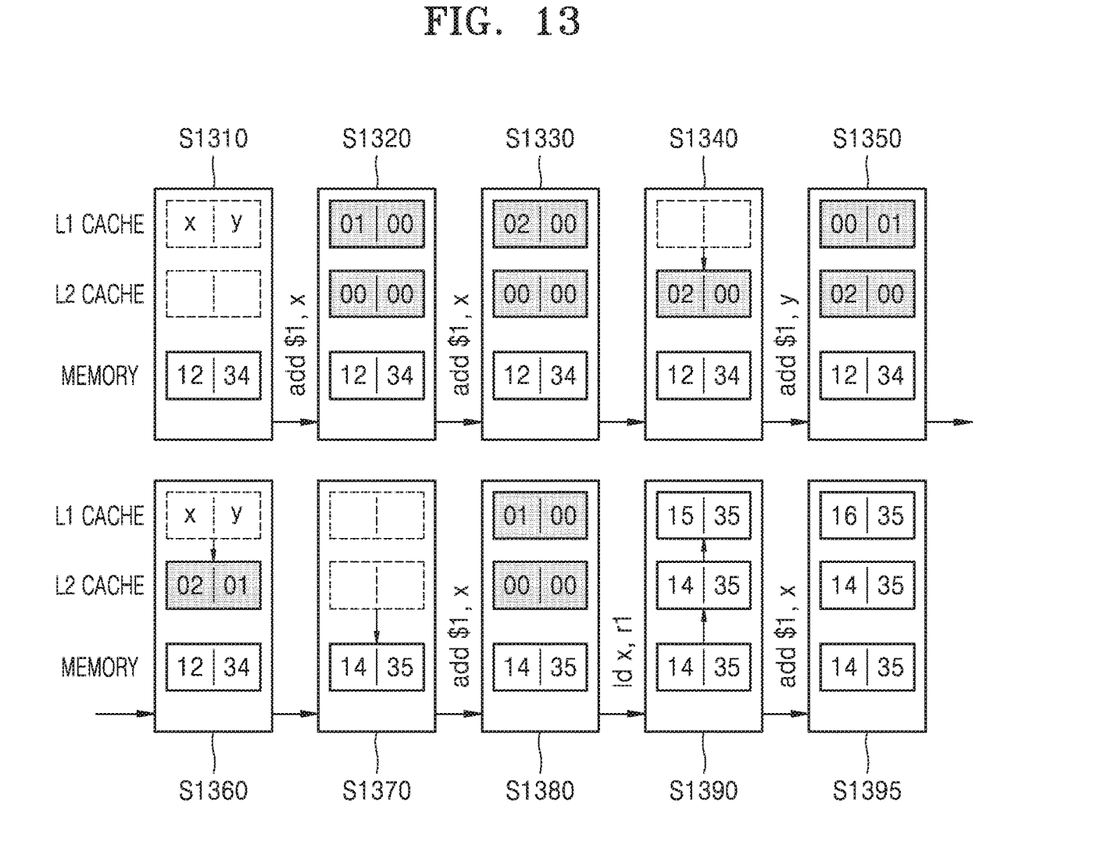
FIG. 13 is a diagram for describing a method by which a computing apparatus including a plurality of levels of caches processes operations, according to some example embodiments.

FIG. 13 is a diagram for describing a method by which a computing apparatus including a plurality of levels of caches processes operations according to some example embodiments. As shown in FIG. 13, the method may include a sequence of operations S1310-S1395 that include an L1 cache, an L2 cache, and a memory.

Specifically, FIG. 13 is a diagram for describing a method by which the computing apparatus 400 according to some example embodiments processes an aggregation operation by using the cache block 620 of FIG. 6 and the method of mapping the second memory 720. Variables x and y of FIG. 13 may be stored in one cache block, and the initial values of the variables x and y are 12 and 34, respectively. Operation S1310 may correspond to operation S1210 as shown in FIG. 12.

In operation S1320, when an operation for adding 1 to the variable x is requested from the core 420 (add $1, x), the core 420 may output information regarding an addition operator and an aggregation operand 1 to the L1 cache 431. Furthermore, the L1 cache 431 may store the aggregation operand 1 in a word of the L1 cache 431 corresponding to the variable x. At this time, since the variable y corresponds to a cache miss, 0, which is the identity of the addition operation, may be stored in a word of the L1 cache 431 corresponding to the variable y. Since all of the L2 caches 432 are a cache miss, 0 may be stored in all words of the L2 caches 432 corresponding to the variables x and y.

In operation S1330, when an operation for adding 1 to the variable x again is requested (add $1, x), a cache controller 440 may perform a partial operation for adding the aggregation operand 1 received from the core 420 to 1 stored in the word of the L1 cache 431 and store a result value 2 of the partial operation in the word of the L1 cache 431 corresponding to the variable x. In some example embodiments, since the variable y corresponds to a cache miss, the word of the L1 cache 431 corresponding to the variable y may maintain 0, which is the identity of the addition operation.

In operation S1340, a cache block of the L1 cache 431 may be released to the L2 cache 432.

In operation S1350, when an operation for adding 1 to the variable y is requested (add $1, y), the core 420 may output information regarding an addition operator and an aggregation operand 1 to the L1 cache 431. The L1 cache 431 may store the aggregation operand 1 in a word of the L1 cache 431 corresponding to the variable y. At this time, since the variable x corresponds to a cache miss, 0, which is the identity of the addition operation, may be stored in a word of the L1 cache 431 corresponding to the variable x. Furthermore, the L2 cache 432 may maintain the cache block that is released in operation (d).

In operation S1360, when the cache block of the L1 cache 431 is released to the L2 cache 432, the cache controller 440 may perform a partial operation for adding the words of the cache block received from the L1 cache 431 to the words of the L2 cache 432 and store result values of the partial operation in the words of the L2 cache 432. Here, since the method of mapping the second memory 720 is applied to the memory 450, operations regarding variable x and the variable y may be independently performed from each other. Therefore, the L2 cache 432 may store the result value 2 of the partial operation regarding the variable x and a result value 1 of the partial operation regarding the variable y.

In operation S1370, a cache block of the L2, cache 432 may be released to the memory 450. At this time, the memory 450 may independently perform an addition operation regarding the variable x and the variable y stored in the memory 450 by using the cache block received from the L2 cache 432. For example, the memory 450 may add the result value 2 of the partial operation to the initial value 12 of the variable x, store a result value 14 of the partial operation in the variable x, add the initial value 34 of the variable y to the aggregation operand 1, and store an partial operation result value in the variable y.

In operation S1380, when an operation for adding 1 to the variable x again is requested (add $1, x), an operation identical to the operation (a) may be performed.

In operation S1390, when an instruction for loading the variable x is received, the core 420 may transfer a cache block including the variable x stored in the memory 450 to the L2 cache 432 and the L1 cache 431 sequentially. Here, since the cache block including the variable x also includes the variable y, the variable y may also be sequentially transferred to the L2 cache 432 and the L1 cache 431. Since the aggregation operand 1 is stored in the word of the L1 cache 431 corresponding to the variable x, the cache controller 440 may perform a partial operation for adding an operand 14 corresponding to the variable x to the aggregation operand 1 stored in the word of the L1 cache 431 and store a result value 15 of the partial operation in the word of the L1 cache 431 corresponding to the variable x.

In operation S1395, when an operation for adding 1 to the variable x again is requested (add $1, x), the cache controller 440 may perform a partial operation for adding a new aggregation operand 1 to the result value 15 of the partial operation stored in the word of the L1 cache 431 and store a result value 16 of the partial operation in the word of the L1 cache 431 corresponding to the variable x.

Figure 14:
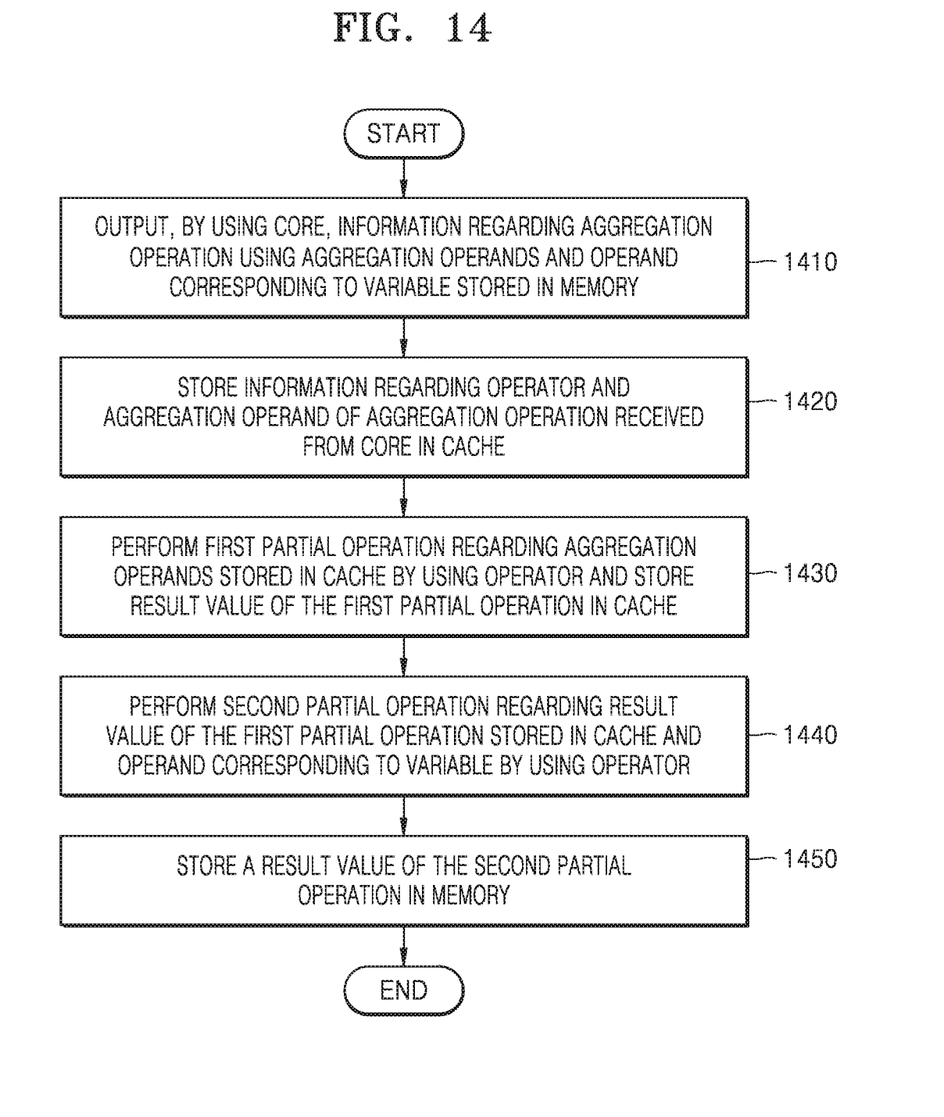
FIG. 14 is a flowchart of a method by which a computing apparatus processes an operation, according to some example embodiments.

FIG. 14 is a flowchart of a method by which a computing apparatus processes an operation, according to some example embodiments. The method shown in FIG. 14 may be implemented by one or more elements (e.g., a processor and a memory device) of a computing apparatus as shown in any of the example embodiments included herein.

In operation 1410, the core 420 ("core device") may output information regarding ("associated with") an aggregation operation using aggregation operands and an operand corresponding to a variable stored in the memory 450 ("memory device"). Specifically, in operation 1410, when an operation requested by an instruction is a set of first partial operation and second partial operation satisfying an exchange rule and a combining rule, the core 420 may determine that the operation is an aggregation operation and output information regarding an operator and aggregation operands of the aggregation operation to the cache 330 based on a result of the determination. Restated, the core 420 may determine an operation requested by an instruction to be the aggregation operation, based on the operation requested by the instruction including a set of the first partial operation and the second partial operation satisfying an exchange rule and a combining rule, and the core 420 may output information associated with the operator and the aggregation operands of the aggregation operation, based on a result of the determination.

In operation 1420, the cache 330 ("cache device" or "cache memory") may store information regarding the operator and the aggregation operands of the aggregation operation received from the core 420. Specifically, the cache 330 may store information regarding the operator in a tag area of the cache 330 and may store at least one of the aggregation operands or a result value of the first partial operation in a cache block.

Furthermore, in the case of a cache miss (e.g., based on a cache miss occurring), in operation 1420, the cache 330 may store the identity of the first partial operation.

In operation 1430, the cache controller 440 may perform a first partial operation with respect to the aggregation operands stored in the cache 330 by ("based on") using the operator and store a result value of the first partial operation in the cache 330.

In operation 1440, the memory 450 may perform a second partial operation with respect to the result value of the first partial operation stored in the cache 330 and the operand corresponding to the variable by using the operator.

When an instruction for loading the variable stored in the memory 450 is received (e.g., based on an instruction associated with loading the variable stored in the memory device being received), the cache controller 440 may perform a second partial operation with respect to the result value of the first partial operation stored in the cache 330 and the operand corresponding to the variable loaded from the memory 450 by using the operator and store a result value of the second partial operation in the cache 330.

In operation 1450, the memory 450 may store the result value of the second partial operation.

An interface of the computing apparatus (e.g., interface 140, interface 360, or the like) may output the stored result value of the first partial operation and/or the second partial operation. Such outputting may include displaying a result value in a display of a display interface, communicating the result value to an external device, some combination thereof, or the like.

Meanwhile, a cache block according to some example embodiments includes a plurality of words, and the size of a word may be identical to that of a bank, which is a unit of data processed in parallel by the memory 450. Restated, each word of the plurality of words may have a size that is identical to a size of a bank, the bank being a unit of data processed in parallel by the memory device, and the cache device and/or cache memory may include a memory controller configured to map each word of the plurality of words to separate banks concurrently with the cache block being released from the cache device. In such a case, the method by which the computing apparatus processes an operation may further include, by using the memory controller 460, mapping a word to a bank as ("based on") a cache block is released from a cache.

Furthermore, the memory 450 according to some example embodiments may further include ("implement") a bank group including a plurality of banks and the calculator 485 for performing a second partial operation with an operator of a released cache block. In this case, the operation for mapping a word to a bank may include performing a second partial operation by using (e.g., "implementing") a plurality of banks included in a bank group and the calculator 485 and storing a result value of the second partial operation in the bank group.

As described above, since the number of times that a processor of a computing apparatus (such a computing apparatus being any of the computing apparatuses included in any of the example embodiments included herein) accesses a memory to process an operation may be reduced, a time period for the processor to process the operation may be reduced (e.g., operating performance and/or operating efficiency of the computing apparatus may be improved) and the energy efficiency of the computing apparatus may be improved. As a result, the functioning ("functionality") of the computing apparatus may be improved, based on performing some or all of the above-described method.

While the inventive concepts have been particularly shown and described with reference to embodiments thereof, it will be understood that various changes in form and details may be made therein without departing from the spirit and scope of the following claims.

What is claimed is:

1. A computing apparatus, comprising:
   a core device configured to output information associated with an aggregation operation, the aggregation operation being performed using a plurality of aggregation operands and an additional operand, the additional operand corresponding to a variable stored in a memory device;
   a cache memory configured to store the information associated with the aggregation operation received from the core device, the information associated with the aggregation operation including an operator and the plurality of aggregation operands;
   a cache controller configured to
      perform a first partial operation of the aggregation operation, the first partial operation being performed using the operator and the plurality of aggregation operands, and
      store a result value of the first partial operation in the cache memory; and
   an interface,
   wherein the memory device is further configured to process the aggregation operation
   by
      performing a second partial operation of the aggregation operation in response to receiving a cache block from the cache memory, the second partial operation being performed using the operator, the result value of the first partial operation and the additional operand corresponding to the variable, the cache block including the result value of the first partial operation and the operator, and the cache block corresponding to the variable, and
      storing a result value of the second partial operation; and
   wherein the interface is configured to output the result value of the second partial operation to one of a display or an external remotely-located device.

2. The computing apparatus of claim 1, wherein, the core device is configured to:
   determine an operation requested by an instruction to be the aggregation operation based on the operation requested by the instruction including a set of the first partial operation and the second partial operation satisfying an exchange rule and a combining rule; and output information associated with the operator and the plurality of aggregation operands of the aggregation operation based on a result of the determination.

3. The computing apparatus of claim 1, wherein the cache controller is configured to:

perform the second partial operation using the result value of the first partial operation, the operator and the additional operand corresponding to the variable loaded from the memory device based on an instruction associated with loading the variable stored in the memory device being received; and store the result value of the second partial operation in the cache memory.

4. The computing apparatus of claim 1, wherein the cache memory is configured to store an identity of the first partial operation based on a cache miss occurring.

5. The computing apparatus of claim 1, wherein the cache controller is configured to implement a calculator to perform the first partial operation.

6. The computing apparatus of claim 1, wherein the cache memory is configured to:

store information associated with the operator in a tag area of the cache memory; and store in the cache block at least one of
the plurality of aggregation operands, or
the result value of the first partial operation.

7. The computing apparatus of claim 6, wherein,
the cache block includes a plurality of words,
each word of the plurality of words has a size that is identical to a size of a bank, the bank being a unit of data processed in parallel by the memory device, and
the cache memory includes a memory controller configured to map each word of the plurality of words to separate banks based on the cache block being released from the cache memory.

8. The computing apparatus of claim 7, wherein
the memory device includes
a bank group including a plurality of banks, and
a calculator configured to perform the second partial operation based on using the operator included in the cache block that is released from the cache memory; and
the calculator is further configured to perform an operation based on using the plurality of banks.

9. A method, comprising:

outputting, by using a core device, information associated with an aggregation operation, the aggregation operation being performed using a plurality of aggregation operands and an additional operand, the additional operand corresponding to a variable stored in a memory;

storing the information associated with the aggregation operation received from the core device in a cache memory, the information associated with the aggregation operation including an operator and the plurality of aggregation operands;

performing, by a cache controller configured to control the cache memory, a first partial operation of the aggregation operation, the first partial operation being performed using the operator and the plurality of aggregation operands;

storing a result value of the first partial operation in the cache memory;

performing, in the memory, a second partial operation of the aggregation operation in response to receiving a cache block from the cache memory, the second partial operation being performed using the result value of the first partial operation, the additional operand corresponding to the variable, and the operator, the cache block including the result value of the first partial operation and the operator, and the cache block corresponding to the variable; and storing a result value of the second partial operation in the memory.

10. The method of claim 9, wherein the outputting the information associated with the aggregation operation includes:

determining an operation requested by an instruction to be the aggregation operation based on the operation requested by the instruction including a set of the first partial operation and the second partial operation satisfying an exchange rule and a combining rule; and outputting information associated with the operator and the plurality of aggregation operands of the aggregation operation based on a result of the determining.

11. The method of claim 9, wherein the performing the second partial operation includes:

performing the second partial operation using the result value of the first partial operation, the operator and the additional operand corresponding to the variable loaded from the memory based on an instruction associated with loading the variable stored in the memory being received; and storing the result value of the second partial operation.

12. The method of claim 9, wherein the storing the information associated with the aggregation operation includes storing an identity of the first partial operation based on a cache miss occurring.

13. The method of claim 9, wherein the storing the information associated with the aggregation operation includes:

storing information associated with the operator in a tag area of a cache; and storing in the cache block at least one of
the plurality of aggregation operands, or
the result value of the first partial operation.

14. The method of claim 13, wherein,
the cache block includes a plurality of words,
each word of the plurality of words has a size that is identical to a size of a bank, the bank being a unit of data processed in parallel by the memory, and
the method further includes mapping each word of the plurality of words to separate banks based on the cache block being released from the cache memory.

15. The method of claim 14, wherein
the memory includes
a bank group including a plurality of banks, and
a calculator configured to perform the second partial operation based on using the operator included in the cache block that is released from the cache memory; and
the mapping each word of the plurality of words to separate banks includes, for each word,
performing an operation using the plurality of banks and the calculator included in the bank group, and
storing the result value of the second partial operation in the bank group.

16. The computing apparatus of claim 1, wherein the cache controller is different from the memory device.

17. The computing apparatus of claim 1, further comprising:
a processor including the core device, the cache memory and the cache controller, the memory device being external to the processor.

18. The computing apparatus of claim 1, wherein the cache memory provides a wider bandwidth and lower storage capacity than the memory device.

19. The method of claim 9, wherein
the performing the first partial operation performs the first partial operation using the cache controller different from the memory; and
the performing the second partial operation performs the second partial operation using the memory.

20. The method of claim 19, wherein
the core device, the cache memory and the cache controller are included in a processor; and
the memory is external to the processor.

* * * * *